US006116090A

United States Patent [19]

Maev et al.

[11] Patent Number: 6,116,090

[45] Date of Patent: Sep. 12, 2000

[54] MULTIEYED ACOUSTICAL MICROSCOPIC LENS SYSTEM

[75] Inventors: Roman Gr. Maev, Windsor, Canada; Konstantin Masolv, College Station, Tex.; Serguei A. Titov, Moscow, Russian Federation

[73] Assignee: DaimlerChrysler Corporation, Auburn Hills, Mich.

[21] Appl. No.: 09/303,301

[22] Filed: Apr. 30, 1999

[51] Int. Cl.[7] .................................................... G01N 29/00

[52] U.S. Cl. ................................ 73/625; 73/626; 73/618

[58] Field of Search ............................ 73/618, 619, 620, 73/621, 625, 626, 627, 628, 632, 633, 634, 641

[56] References Cited

U.S. PATENT DOCUMENTS

| | | | |
|---|---|---|---|
| 3,575,044 | 4/1971 | Gibbs et al. . | |
| 3,739,628 | 6/1973 | Saglio . | |
| 3,868,847 | 3/1975 | Gunkel . | |
| 3,895,685 | 7/1975 | Gillette et al. . | |
| 3,958,451 | 5/1976 | Richardson . | |
| 3,960,005 | 6/1976 | Vezina . | |
| 4,012,946 | 3/1977 | Patsey . | |
| 4,208,917 | 6/1980 | Aoyama et al. . | |
| 4,480,475 | 11/1984 | Tsao et al. . | |
| 4,712,722 | 12/1987 | Hood et al. . | |
| 4,821,575 | 4/1989 | Fujikake et al. | 73/626 |
| 5,060,518 | 10/1991 | Aleshin et al. . | |
| 5,439,157 | 8/1995 | Geier et al. . | |
| 5,474,225 | 12/1995 | Geier et al. . | |
| 5,533,401 | 7/1996 | Gilmore | 73/622 |
| 5,537,875 | 7/1996 | Viehmann et al. . | |

*Primary Examiner*—Richard A. Moller
*Attorney, Agent, or Firm*—Roland A. Fuller, III

[57] ABSTRACT

The present invention provides an acoustical microscope which has a plurality of acoustical transducers, each generating an independent beam of acoustic energy. Each acoustical transducer is positioned in an adjacent relationship with the others such that each beam of acoustic energy intersects a different point on a target.

6 Claims, 2 Drawing Sheets

Fig-3
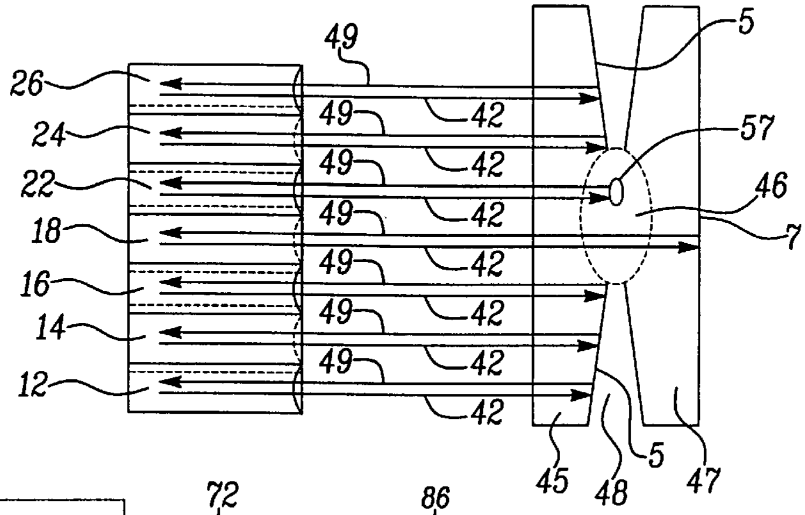
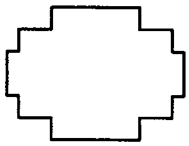
Fig-4
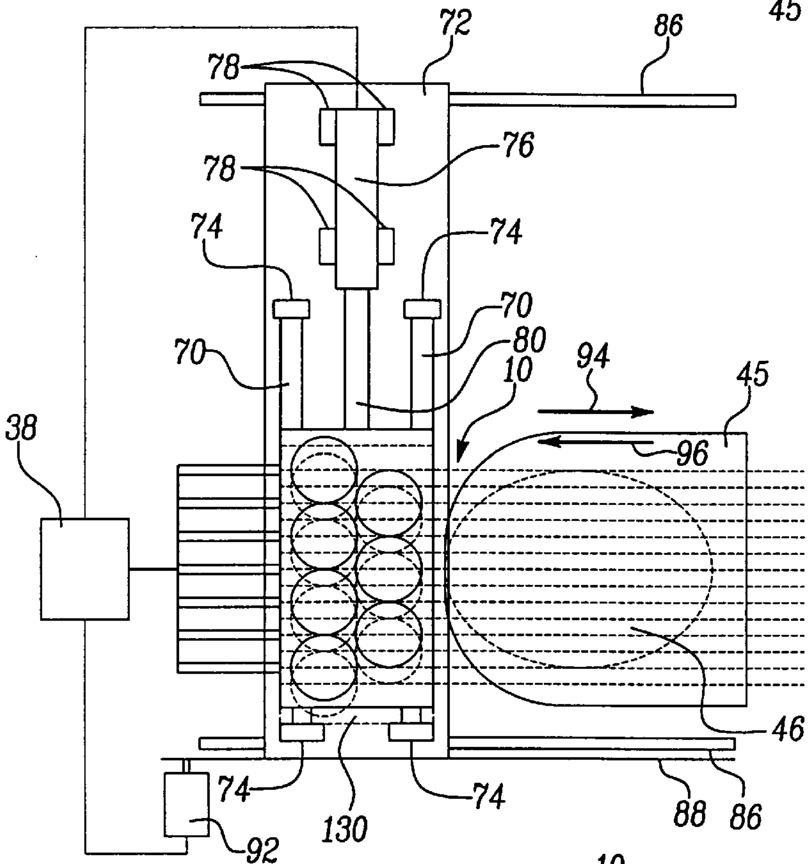
Fig-5
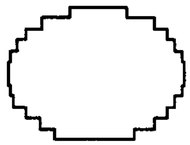
Fig-7
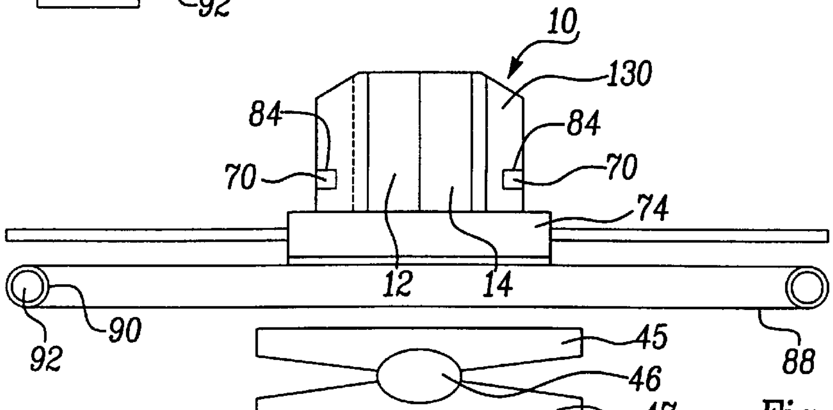
Fig-6

MULTIEYED ACOUSTICAL MICROSCOPIC LENS SYSTEM

BACKGROUND OF THE INVENTION

1. Technical Field

The present invention relates generally to an acoustical microscopic and, more particularly, to a multieyed acoustical microscopic sensor having a plurality of acoustical transducers.

2. Discussion

Welding is a common process for attaching one metal member to another. This process generally involves heating an interface between the items which are to be welded, thereby melting the interface into one joint or weld nugget. Because this process has its application in many different types of manufacturing, such as automobile manufacturing, inspection ensuring that the weld nugget meets certain quality standards is a must. Specifically, it is desirable to inspect the area, size and configuration of the weld nugget and to determine if any defects exist therein. Uninspected welds may result in weld failure after the welded item is sold or distributed to a final user.

Ideally, a weld is inspected either during or shortly after the welding process so that added inspection does not increase weld time, and to allow weld problems to be identified when they occur. Furthermore, non-destructive testing is preferred so that welded parts which pass inspection may still be sold or distributed to the end user.

Visual inspection systems have been employed in the weld environment for this purpose. Specifically, an individual, such as a quality control person, may gage the size of the weld nugget or destructively test a welded item to determine its internal characteristics. However, these methods have several drawbacks. First, because of the bright light and harsh conditions generated by welding, visual inspection of a weld cannot be performed during the welding process. Instead, the welded item must be inspected off line, adding more time and cost to manufacturing. Second, to properly inspect the weld for defects, the internal structure of the weld nugget must be observed. This, in many instances, requires the welded item to be destructively tested, rendering the welded item useless. Besides the increased cost associated with scrapping an item for the purpose of inspection, it is practically impossible to destructively test all items. As such, destructive testing results in a lower number of samples tested and increased cost to manufacturing.

Acoustical microscopy is one possible solution to this inspection problem. Typically, acoustical microscopes use a single transducer to analyze a test subject or target. The use of such a device to inspect welds has several drawbacks. First, an acoustical microscope employing a single transducer can only inspect one area of the target at any given time. As such, inspection of a complete cross section of a target would require the transducer to be constantly repositioned to ensure that all points on the target are inspected. To obtain a detailed cross section, many readings, resulting in a large consumption of time, would have to be taken. The present invention was developed in light of these drawbacks.

SUMMARY OF THE INVENTION

The present invention addresses the aforementioned drawbacks, among others, by providing an acoustical microscope which has a plurality of acoustical transducers, each transducer generating an independent beam of acoustic energy. Each transducer is positioned in an adjacent relationship with the others such that each beam of acoustic energy intersects a different point on a target. As a result, multiple points on a target are inspected at any given time. Each beam of acoustic energy is generated for a short time period, ensuring that its respective acoustical transducer is not transmitting when acoustic energy is being received from the target. The computer processes received acoustic energy, reflected back by the target, and generates an image of its respective portion of the target therefrom. The use of multiple transducers allows each transducer to have its own independent acoustic properties.

In another aspect of the present invention, the computer instructs each acoustical transducer to sequentially generate a beam of acoustic energy. This ensures that only one beam of acoustic energy is being sent or received at any given time. As a result, noise generated from multiple beams of acoustic energy is reduced. The transducers may also be laterally shifted in a direction perpendicular to the acoustical axis. This acts to increase the resolution of any generated image.

Additional advantages and features of the present invention will be apparent from the subsequent description and the appended claims taken in conjunction with the accompanying drawings.

BRIEF DESCRIPTION OF THE DRAWINGS

In the drawings which illustrate the best mode presently contemplated for carrying out the present invention:

FIG. 3 is a side cross sectional view of an acoustical microscope according to the present invention;

FIG. 4 is an image generated by an acoustical microscope according to the present invention;

FIG. 5 is a top cross sectional view of an acoustical microscope according to a second embodiment of the present invention;

FIG. 6 is a side cross sectional view of an acoustical microscope according to a second embodiment of the present invention; and FIG. 7 is an image generated from an acoustical microscope according to the present invention.

DETAILED DESCRIPTION OF THE PREFERRED EMBODIMENTS

Figure 1:
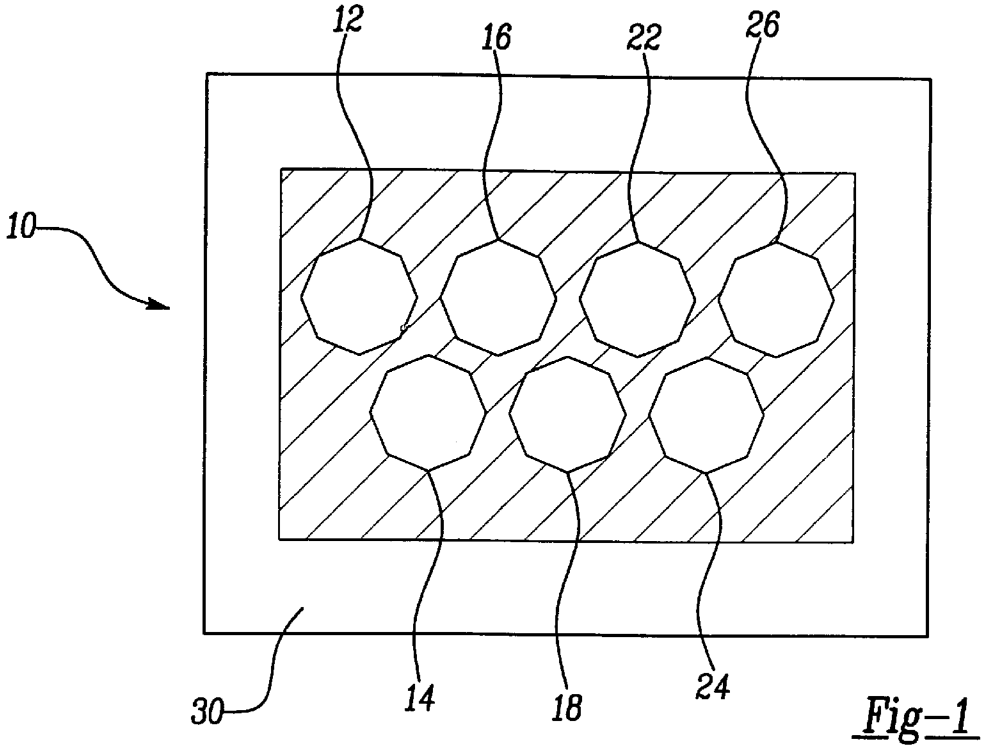
FIG. 1 is a top cross sectional view of an acoustic sensor according to the present invention.
Figure 2:
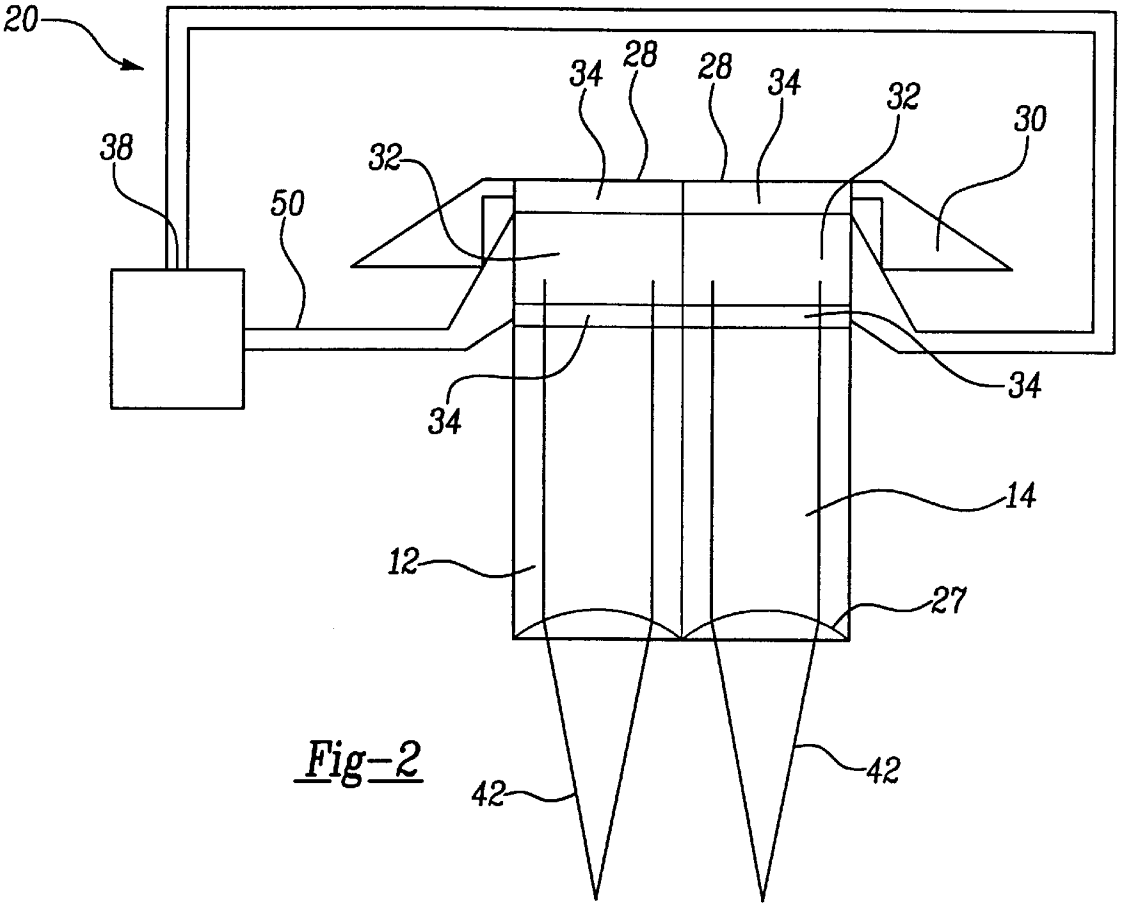
FIG. 2 is a side cross sectional view of an acoustical microscope according to the present invention.

With reference to FIGS. 1 and 2, acoustical microscope 20 is now described. In FIG. 1, acoustic sensor 10 includes a plurality of acoustical transducers 12, 14, 16, 18, 22, 24, and 26, which are supported and maintained in a parallel relationship, at one end, by fixture 30. Each acoustical transducer 12, 14, 16, 18, 22, 24, or 26 is preferably either cylindrically focused or spherically focused and can have its own independent acoustical parameters, allowing it to act independently from the remainder. However,the acoustical transducers 12, 14, 16, 18, 22, 24, 26 can also be conical and toroidal focused. These parameters include focal radius, aperture and other acoustical properties. The independence of these properties allows each lens to provide a high-resolution image.

In FIG. 2, acoustic sensor 10 is shown combined with computer 38 by connections 50 to form acoustical microscope 20. As illustrated with respect to acoustical transducers 12 and 14 in FIG. 2, electrical contacts 34 are attached to connections 50 and sandwich flat plates of piezoelectric crystal 32 therebetween. Each acoustical transducer focuses beams of acoustic energy 42, generated by each piezoelectric crystal 32 (as will be discussed), by the use of focusing lens 27. Focusing lens 27 converges beam of acoustic energy 42 to a focal point. By focusing beams of acoustic energy, a greater resolution of a target may be obtained. The focal distance of focusing lens 27 is preferably ten times its diameter.

It is noted that remaining acoustical transducers 16, 18, 22, 24, and 26 operate in the same fashion as acoustical transducers 12 and 14. However, it should be appreciated that the principles of the present invention are not limited to any particular acoustical transducer, and that the present invention may be applicable to a wide variety of other similar acoustical transducers.

With reference to FIG. 3, the general operation of the present invention is now described. In FIG. 3, a weld nugget 46 is shown joining metal plates 45 and 47. Where weld nugget 46 does not join metal plates 45 and 47, gap 48 separates metal plates 45 and 47. In operation, acoustic sensor 10 is aimed at weld nugget 46. Computer 38 first creates a short pulse of current flow through connections 50, across electrical contacts 34 and across piezoelectric crystals 32 of acoustical transducers 12, 14, 16, 18, 22, 24, and 26. Current flow across piezoelectric crystals 32 causes each crystal to vibrate which, in turn, creates beams of acoustic energy 42 originating at each respective acoustical transducer. The short pulse of current generated by computer 38 ensures that each beam of acoustic energy 42 is also a short pulse. The combined beams of acoustic energy 42 from all transducers 12, 14, 16, 18, 24, and 26 is hereinafter referred to as a front of acoustic energy. It is noted, however, that the combined beams of acoustic energy 42 need not occupy the same temporal space to form a front of acoustic energy. As such, beams of acoustic energy 42 may be fired at different times.

Each beam of acoustic energy 42 travels in a direction away from acoustic sensor 10 and toward metal plates 45 and 47 and weld nugget 46. Beams of acoustic energy 42 which intersect gap 48 are reflected thereby, whereas beams of acoustic energy 42 which intersect weld nugget 46 either pass through weld nugget and are reflected by transition area 7 or intersect some imperfection such as air pocket 57 and are reflected thereby. For example, as shown in FIG. 3, acoustical transducers 12, 14, 16, 24, and 26 fire beams of acoustic energy 42 at areas outside weld nugget 46 while acoustical transducers 18 and 22 fire beams of acoustic energy toward weld nugget 46. Beams of acoustic energy 42 from acoustical transducers 12, 14, 16, 24, and 26 are reflected by transition area 5, where metal plate 45 transitions to gap 48, creating reflected acoustic energy 49. Alternatively, beam of acoustic energy 42 from acoustical transducer 18 travel through weld nugget 46 and bounce off transition area 7, again forming reflected acoustic energy 49. Similarly, beams of acoustic energy 42 from acoustical transducer 22 intersects air pocket 57 and is reflected thereby.

Reflected acoustic energy 49 travels back from transition area 5, transition area 7, and air pocket 57, resonating each originating piezoelectric crystal 32 (see FIG. 2) and creating an induced current in connections 50. The short pulses of beams of acoustic energy 42 ensure that each acoustical transducer 12, 14, 16, 18, 22, 24, and 26 has ceased generating acoustical energy when the reflected acoustic energy 49 travels to each acoustical transducer 12, 14, 16, 18, 22, 24, and 26. As such, acoustical transducers 12, 14, 16, 18, 22, 24, and 26 operate in transmission mode when producing beams of acoustical energy 42 and operate in receiver mode when receiving reflected acoustic energy 49. Computer 38 determines the boundaries of weld nugget 46 and the existence of imperfections such as air pocket 57 by comparing the time of return of reflected acoustic energy 49.

Instead of simultaneous generation of beams of acoustic energy 42, acoustical transducers 14, 16, 18, 22, 24, and 26 can generate beams of acoustic energy 42 sequentially. This allows only one beam of acoustic energy 42 to be fired and received at any given time. When using this method, acoustical transducer 12 first generates a beam of acoustic energy 42 and receives reflected acoustic energy 49. After this reflected acoustic energy is received, acoustical transducer 14 generates beam of acoustic energy 42 and receives the resulting reflected acoustic energy 49. By following this method, the remainder of acoustical transducers 16, 18, 22, 24 and 26 sequentially generate beams of acoustic energy 42 and receive reflected acoustic energy 49 by the same process. Since only one acoustical transducer is transmitting and receiving acoustic energy at any given time, noise created by interference of separate beams of acoustic energy 42 and reflected acoustic energy 49 is greatly reduced.

Referring to FIGS. 5 and 6, a second embodiment of the present invention is shown. In FIG. 5, acoustic sensor 10 is in sliding engagement with rails 70 which are, in turn, attached to support 72 at attachment 74. Solenoid 76 is attached to support 72 at points 78 and is attached to acoustic sensor 10 by shaft 80. To accommodate rails 70, as shown in FIG. 6, fixture 130 has grooves 84.

Support 72 is in sliding engagement with rails 86 to allow support 72 to slide back and forth across metal plates 45 and 47 and weld nugget 46. Band 88 is attached to support 72 and meshed with motor sprocket 90, attached to motor 92, to move support 72 along rails 86. Motor 92 is in electrical communication with computer 38, supplying computer 38 with information regarding the position of support 72 along rails 86.

In operation, computer 38 instructs motor 92 to move support 72 along rails 86 in direction 94. While support 72 is moving, computer 38 instructs acoustic sensor 10 to fire a succession of fronts of acoustic energy by any of the methods discussed above. Because each front of acoustic energy travels at an extremely fast speed as compared to the velocity of support 72 along rails 86, each acoustical transducer travels a very short distance from the time each beam of acoustic energy 42 is generated until each reflected acoustic energy 49 is received. As such, each acoustical transducer receives reflected acoustic energy 49 from each beam of acoustic energy 42 which is generated. After support 72 makes one complete sweep in direction 94, computer 38, by knowing the distance along rails 86 which each pulse of acoustic energy was generated and by use of the methods discussed previously, generates the longitudinal scan as shown in FIG. 4.

Computer 38 then instructs solenoid 76 to move acoustic sensor 10 slightly downward, as shown, along rails 70 to a new position. The process as depicted in the previous paragraph is then repeated in direction 96, obtaining, once again, a longitudinal scan of the weld nugget 46.

Computer 38 then combines the first and second longitudinal scan to form the resulting longitudinal scan as shown in FIG. 7. Because acoustic sensor 10 is moved slightly downward, the longitudinal scan as depicted in FIG. 7 has twice the resolution as that depicted in FIG. 4. As such, it is noted that acoustic sensor 10 may be moved may different increments at any number of different times to obtain a desired resolution.

While the above detailed description describes the preferred embodiment of the invention, it should be understood that the present invention is susceptible to modification, variation, and alteration without deviating from the scope and fair meaning of following claims.

What is claimed is:

1. An acoustical microscope for use in a welding environment, comprising:

a plurality of acoustical transducers, wherein each of said plurality selectively generates a beam of acoustic energy, each of said plurality is positioned in an adjacent relationship with a remainder of said plurality such that each beam of acoustic energy follows a path parallel to each remaining beam of acoustic energy;

a computer in electrical communication with each of said plurality, said computer selectively instructing each of said plurality to generate said beam of acoustic energy for a short time duration such that each of said plurality operates in a transmission mode and a receiver mode, said computer processing reflected acoustic energy received by each of said plurality when each of said plurality is in said receiver mode, said computer analyzing said processed reflected acoustic energy;

a device for laterally shifting said plurality of acoustical transducers, said device selectively moving said plurality of acoustical transducers to provide said computer with information to generate a first longitudinal scan; and said device selectively laterally shifts and moves said plurality of acoustical transducers to provide said computer with information to generate a second longitudinal scan, said computer selectively combining said first longitudinal scan and said second longitudinal scan to form a third longitudinal scan.

2. An acoustical microscope as claimed in claim 1, wherein said computer instructs each of said plurality to sequentially generate said beam of acoustic energy.

3. An acoustical microscope as claimed in claim 2, wherein only one of said plurality is generating said beam of acoustic energy or receiving said reflected acoustic energy at any given time.

4. A method for using an acoustical microscope, comprising the steps of:

a. providing at least one acoustic sensor in electrical communication with a computer;

b. moving said acoustic sensor across a face of a target in a first direction to obtain a first longitudinal scan;

c. laterally shifting said acoustic sensor;

d. moving said acoustic sensor across said face of said target in a second direction to obtain a second longitudinal scan; and e. combining said first longitudinal scan and said second longitudinal scan to obtain a third longitudinal scan.

5. The method as claimed in claim 4, wherein said target is a weld nugget.

6. The method as claimed in claim 4, wherein said acoustic sensor contains a plurality of acoustical transducers.

* * * * *